Dec. 17, 1963             C. HOEN             3,114,388

UNDULAR SPRINGS FOR COMPRESSOR VALVES

Filed July 28, 1960                                2 Sheets—Sheet 1

INVENTOR
CORNELIS HOEN
BY
ATTORNEY

Dec. 17, 1963  C. HOEN  3,114,388
UNDULAR SPRINGS FOR COMPRESSOR VALVES
Filed July 28, 1960  2 Sheets-Sheet 2
Fig. 3
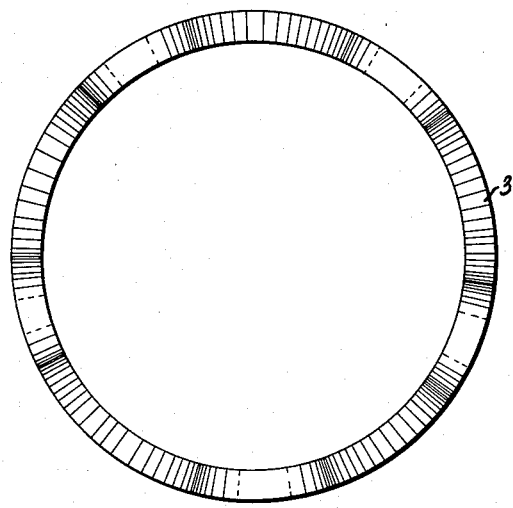
Fig. 3A
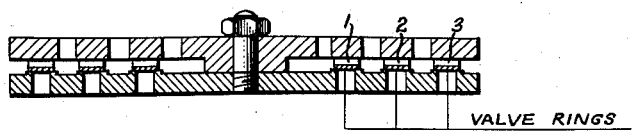
Fig. 4
INVENTOR
CORNELIS HOEN
BY
ATTORNEY

United States Patent Office 3,114,388
Patented Dec. 17, 1963

3,114,388
UNDULAR SPRINGS FOR COMPRESSOR VALVES
Cornelis Hoen, Vught, Netherlands, assignor to Grasso's Koninklijke Machinefabrieken N.V., Hertogenbosch, Netherlands, a corporation of the Netherlands
Filed July 28, 1960, Ser. No. 45,889
Claims priority, application Netherlands Aug. 22, 1959
1 Claim. (Cl. 137—512)

The invention relates to a spring shaped like a flat ring, which has been bent out of the plane of the ring.

Springs originally consisting of a flat ring are known which have been shaped by bending about one axis. Springs of this kind have the disadvantage that when they are placed unloaded on a flat surface, linear contact takes place only on the convex side, whilst contact on the concave side is in points.

The object of the invention is to provide a spring which on the contrary had been bent in such a way that at the tops and the hollows of the undulations there is always linear contact with a flat surface. This object is attained according to the invention by the feature that the tangents at the zones bent out most (tops and hollows) cross or cut the axis of the ring at right angles. By this measure it is also ensured that the ratio between force and compression is constant through the first stage of the compression, upon which its value increases rapidly.

The application of the springs according to the invention is of particular importance in compressors. Up to the present, helical springs were generally used to ensure the required spring load on the valve rings. These helical springs have several disadvantages.

In the first place helical springs have small dimensions, since the width of the valve rings is kept small, so that the space required for the valves may be small, though a wide passage is retained. In view of their small dimensions fairly large numbers of springs will be required for each valve. This is especially the case for delivery valves and high speeds.

In the second place, breakage of the springs may entail the possibility of bits of them getting between the moving parts, thus causing damage. The greater the number of springs, the greater the risk of breakage.

Moreover, in the manufacture of the valves special attention has to be paid to the shape and the machining of the spring eyes in order to obtain maximum reliability and useful life of the springs which tends to raise the cost price considerably.

By the application of the undular springs according to the invention these disadvantages are obviated.

If in compressors use is made of valves with independently movable, concentrically placed valve rings of standardized dimensions, with constant width and thickness, the mean diameter increasing according to an arithmetical progression of the first order, the area and the weight (mass) of these valve rings also increases according to this progression. If the undular springs are also standardized to have constant width and thickness, while at the same time the height of the undulations and the centre distance between them is constant and the diameter is equal to the mean diameter of the valve ring in question, the spring load per sq. cm. of valve-ring area becomes constant for all the rings.

This means that at a given gas pressure the valve rings are simultaneously forced off their seats, with the same acceleration. They offer equal resistance to the flow of gas and have the same resonance frequency.

A spring according to the invention is thus also characterized by equal shape and height of the undulations.

The invention also provides a series of undular springs for which both the mean diameter of the successive rings and the number of undulations of each ring increase according to an arithmetical progression of the first order, in such a way that the two progressions can be reduced to one common progression by dividing or multiplying the terms by a given factor.

In addition the invention relates to a compressor with valves, provided with independently movable, concentrically placed valve rings with springs according to the constructions described above.

Moreover the invention relates to a compressor with valves, provided with independently movable, concentrically placed valve rings of constant width and thickness, in which springs from the above-mentioned series of undular springs are used, the mean diameter of each valve ring invariably being equal to the mean diameter of one of the springs from this series.

The invention will be elucidated further with reference to the drawings.

FIGURE 3 illustrates a spring according to the invention with five undulations.

FIGURE 3A is another view of the spring of FIGURE 3.

FIGURE 4 illustrates the use of the springs of this invention with a plurality of valve rings.

Figure 1:
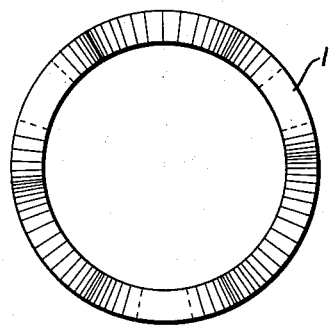
FIGURE 1 illustrates a spring according to the invention with three undulations.
Figure 1A:
FIGURE 1A is another view of the spring of FIGURE 1.
Figure 2:
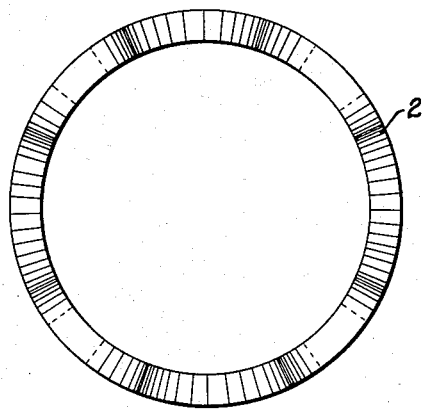
FIGURE 2 illustrates a spring according to the invention with four undulations.
Figure 2A:
FIG. 2A is another view of the spring of FIGURE 2.

FIGURES 1, 2, and 3 show springs according to the invention with 3, 4 and 5 undulations respectively.

These springs 1, 2, 3 as shown in FIGURES 1, 2 and 3 are specimens from a series according to the invention in which both the diameter and the number of undulations increase, with constant thickness and width, according to an arithmetical progression of the first order, while the height of the undulations has also been taken constant.

The following table lists some more springs from this series.

| Valve ring No. | Mean diameter | Derived from series | Width | Internal diameter/external diameter | Number of undulations of each spring |
|---|---|---|---|---|---|
| 1 | 36 | 2 | 6 | 30/42 | 2 |
| 2 | 54 | 3 | 6 | 48/60 | 3 |
| 3 | 72 | 4 | 6 | 66/78 | 4 |
| 4 | 90 | 5 | 6 | 84/96 | 5 |
| 5 | 108 | 6 | 6 | 102/114 | 6 |

In this case the arithmetical progression is 2–3–4–5–6, etc., while the base of the mean diameter is 18 and that of the number of undulations is 1.

If in a compressor, for instance, the mean diameter of the valve rings is equal to the mean diameter of the spring used on them, taking the width of the rings equal, the spring load per sq. cm. of valve-ring area will be constant for all the rings.

Suppose the width of the valve ring=$b$, then the area of the valve ring with factor $n$ from the series will be $\pi.n.18b$. This valve ring is loaded by a spring with $n$ undulations. For each undulation, therefore, the area is $$\frac{\pi.n.18b}{n}=\pi.18b$$

i.e. it is independent of the number $n$. Since the undulations have the same dimensions, the load on each sq. cm. of valve-ring area will be equal.

If the thickness of the valve rings is now also taken equal, their weight will increase in proportion to $n$, so that owing to the equal spring load per sq. cm. the acceleration will also become equal.

With a spring according to the invention, therefore, it is simple to produce correspondingly standardized springs and valve rings for a compressor, for instance, by which means at a given gas pressure the valve rings are simultaneously forced with the same acceleration off their seats, as a result of which they offer equal resistance to the flow of gas, while at the same time having the same resonance frequency.

Another advantage of the springs according to the invention is that in the two positions rotated through 180° with respect to one another about an axis in the main plane of the spring they will produce the same effect.

Further advantages are:

(1) The number of springs to each valve is considerably smaller than when helical springs are used.

(2) The risk of breakage of the springs is very small, while even if a spring should break, the risk of damage owing to bits chipping off is much smaller than with the use of helical springs, for instance.

(3) Because the spring eyes can be dispensed with, the manufacture of valves is simplified considerably.

(4) Up to a given compression the characteristic curve of the spring has a rectilineal shape, after which it becomes progressively steeper. This means that during the opening of the valve, the spring is braked progressively, so that the impact on the restrictor of stroke, which occurs when helical springs are used, is avoided. This will also increase the useful life and reliability. The shape of the characteristic curve of the spring has been found experimentally.

What I claim is:

A valve assembly comprising a plurality of concentrically arranged spring-loaded valve rings having essentially the same width and thickness, annular springs operatively engaging corresponding ones of said rings, each spring being provided with a plurality of undulations, the undulations of said springs having the same shape, height and wave length, the mean diameter of each spring being essentially equal to the mean diameter of the corresponding ring, and the mean diameter of successive rings and number of undulations of successive springs increasing accordingly to arithmetic progressions whereby the spring loading per unit area upon the rings is essentially constant.

References Cited in the file of this patent

UNITED STATES PATENTS

| | | |
|---|---|---|
| 1,386,735 | Schaefer | Aug. 9, 1921 |
| 1,689,608 | Williams et al. | Oct. 30, 1928 |
| 1,722,478 | Nelson | July 30, 1929 |
| 1,768,842 | Holdsworth | July 1, 1930 |
| 2,213,259 | Paget | Sept. 3, 1940 |
| 2,679,378 | Uhler | May 25, 1954 |
| 2,886,380 | Lambeek | May 12, 1959 |

FOREIGN PATENTS

| | | |
|---|---|---|
| 528,424 | Canada | July 31, 1956 |
| 1,106,745 | France | July 25, 1955 |